(12) United States Patent
Watanabe et al.

(10) Patent No.: US 10,852,457 B2
(45) Date of Patent: Dec. 1, 2020

(54) IMAGING DEVICE

(71) Applicant: OLYMPUS CORPORATION, Hachioji (JP)

(72) Inventors: Satoshi Watanabe, Tokyo (JP); Kazuaki Murayama, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/679,724

(22) Filed: Nov. 11, 2019

(65) Prior Publication Data

US 2020/0073022 A1   Mar. 5, 2020

Related U.S. Application Data

(63) Continuation of application No. PCT/JP2017/018410, filed on May 16, 2017.

(51) Int. Cl.
*G02B 3/00* (2006.01)
*H04N 5/225* (2006.01)
*G02B 21/36* (2006.01)

(52) U.S. Cl.
CPC ......... *G02B 3/0006* (2013.01); *G02B 21/361* (2013.01); *G02B 21/362* (2013.01); *H04N 5/22541* (2018.08)

(58) Field of Classification Search
CPC . H04N 5/00; G02B 21/00; G02B 3/00; G03B 15/00; G03B 17/00; G03B 21/00
See application file for complete search history.

(56) References Cited

U.S. PATENT DOCUMENTS 8,305,429 B2   11/2012   Kajihara et al.
8,675,114 B2    3/2014   Watanabe et al.
(Continued)

FOREIGN PATENT DOCUMENTS

EP   2104334 A1   9/2009
JP   2007199226 A   8/2007
(Continued)

OTHER PUBLICATIONS

International Search Report (ISR) dated Aug. 15, 2017 (and English translation thereof) issued in International Application No. PCT/JP2017/018405.
(Continued)

*Primary Examiner* — Maryam A Nasri
(74) *Attorney, Agent, or Firm* — Holtz, Holtz & Volek PC

(57) ABSTRACT

An imaging device of the present invention includes: an imaging optical system that collects light from a subject and forms a primary image of the subject; a microlens array having a plurality of microlenses (5a) that are two-dimensionally arrayed at a position of the primary image formed by the imaging optical system or a position conjugate with the primary image; a relay optical system that relays light collected by the microlenses; a light-receiving part that receives, with a plurality of light-receiving elements, the light relayed by the relay optical system; and an adjusting unit that switches between a first layout state, in which the a plurality of light-receiving elements and back focal positions of the microlenses are conjugate with each other, and a second layout state, in which the plurality of light-receiving elements and principal-point positions of the microlenses are conjugate with each other.

6 Claims, 11 Drawing Sheets

(56) References Cited

U.S. PATENT DOCUMENTS

| | | | |
|---|---|---|---|
| 9,063,313 B1* | 6/2015 | Hasharoni | G02B 6/4249 |
| 9,113,066 B2 | 8/2015 | Watanabe | |
| 9,201,289 B2 | 12/2015 | Tanaka et al. | |
| 10,021,289 B2 | 7/2018 | Inagaki | |
| 10,321,044 B2 | 6/2019 | Inagaki | |
| 2008/0165270 A1 | 7/2008 | Watanabe et al. | |
| 2008/0309813 A1* | 12/2008 | Watanabe | G02B 27/0075 |
| | | | 348/340 |
| 2010/0066812 A1* | 3/2010 | Kajihara | H04N 5/232 |
| | | | 348/46 |
| 2013/0216199 A1* | 8/2013 | Nakajima | H04N 9/045 |
| | | | 386/224 |
| 2013/0235261 A1 | 9/2013 | Berkner et al. | |
| 2013/0279012 A1* | 10/2013 | Lee | G02B 3/0043 |
| | | | 359/622 |
| 2014/0184885 A1* | 7/2014 | Tanaka | G03B 13/36 |
| | | | 348/345 |
| 2016/0191787 A1* | 6/2016 | Inagaki | H04N 5/3696 |
| | | | 348/349 |
| 2018/0270409 A1 | 9/2018 | Inagaki | |

FOREIGN PATENT DOCUMENTS

| | | |
|---|---|---|
| JP | 2008167395 A | 7/2008 |
| JP | 2008172347 A | 7/2008 |
| JP | 2008312080 A | 12/2008 |
| JP | 2009017079 A | 1/2009 |
| JP | 2010102230 A | 5/2010 |
| JP | 2013122505 A | 6/2013 |
| JP | 2013187914 A | 9/2013 |
| JP | 2014086899 A | 5/2014 |
| JP | 2014130277 A | 7/2014 |
| JP | 2014206563 A | 10/2014 |
| JP | 2015041950 A | 3/2015 |
| JP | 2015046019 A | 3/2015 |
| JP | 2016126144 A | 7/2016 |
| WO | 2018211601 A1 | 11/2018 |

OTHER PUBLICATIONS

International Search Report (ISR) dated Aug. 15, 2017 (and English translation thereof) issued in International Application No. PCT/JP2017/018410.

Written Opinion (WO) dated Aug. 15, 2017 issued in International Application No. PCT/JP2017/018405.

Written Opinion (WO) dated Aug. 15, 2017 issued in International Application No. PCT/JP2017/018410.

Related U.S. Appl. No. 16/679,890; Title: Image Acquisition Device and Image Acquisition System; First Named Inventor: Satoshi Watanabe; filed Nov. 11, 2019.

* cited by examiner

US 10,852,457 B2

IMAGING DEVICE

CROSS-REFERENCE TO RELATED APPLICATIONS

This is a continuation of International Application PCT/JP2017/018410, with an international filing date of May 16, 2017, which is hereby incorporated by reference herein in its entirety.

TECHNICAL FIELD

The present invention relates to an imaging device.

BACKGROUND ART

A known light-field imaging device in the related art includes: an imaging element in which a plurality of pixels are two-dimensionally arranged; and a microlens array disposed closer to a subject than the imaging element is and having microlenses disposed so as to correspond to the plurality of pixels of the imaging element, and the light-field imaging device images a three-dimensional distribution image of the subject (for example, see Japanese Unexamined Patent Application Publication No. 2010-102230).

Typically, because the image intensity obtained by a light-field imaging device is different from the image intensity obtained by a regular imaging device, it is not possible to intuitively recognize basic information, such as the plane position of a subject and the distance to the subject, from an image acquired by a light-field imaging device, without image processing. A large amount of processing is required to process and display, in real time, an image obtained by a light-field imaging device. Hence, considering the usability for a user, in order for the user to determine the basic composition, such as the plane position of and the distance to the subject, it is desirable that the light-field imaging device enable, with a simple configuration, observation equivalent to ordinary observation. Because the essential purpose of the light-field imaging device is to obtain a high-quality light-field image, it is desirable that the light-field imaging device have an optical system that does not degrade the light-field image.

A camera lens adapter disclosed in Japanese Unexamined Patent Application Publication No. 2010-102230 is inserted between a lens and a body of an interchangeable-lens camera to enable acquiring of a light-field image.

SUMMARY OF INVENTION

An aspect of the present invention is an imaging device including: an imaging optical system that collects light from a subject and forms a primary image of the subject; a microlens array having a plurality of microlenses that are two-dimensionally arrayed at a position of the primary image formed by the imaging optical system or a position conjugate with the primary image and that collect light coming from the imaging optical system; a relay optical system that relays the light collected by the microlenses and re-forms the primary image to form a secondary image; a light-receiving part that has a plurality of light-receiving elements disposed in an area corresponding to each of the plurality of microlenses, the plurality of light-receiving elements receiving the light relayed by the relay optical system and photoelectrically converting the light; and an adjusting unit that switches between a first layout state, in which the plurality of light-receiving elements and back focal positions of the microlenses are conjugate with each other, and a second layout state, in which the plurality of light-receiving elements and principal-point positions of the microlenses are conjugate with each other.

DESCRIPTION OF EMBODIMENTS

An imaging device according to an embodiment of the present invention will be described below with reference to the drawings.

Figure 1:
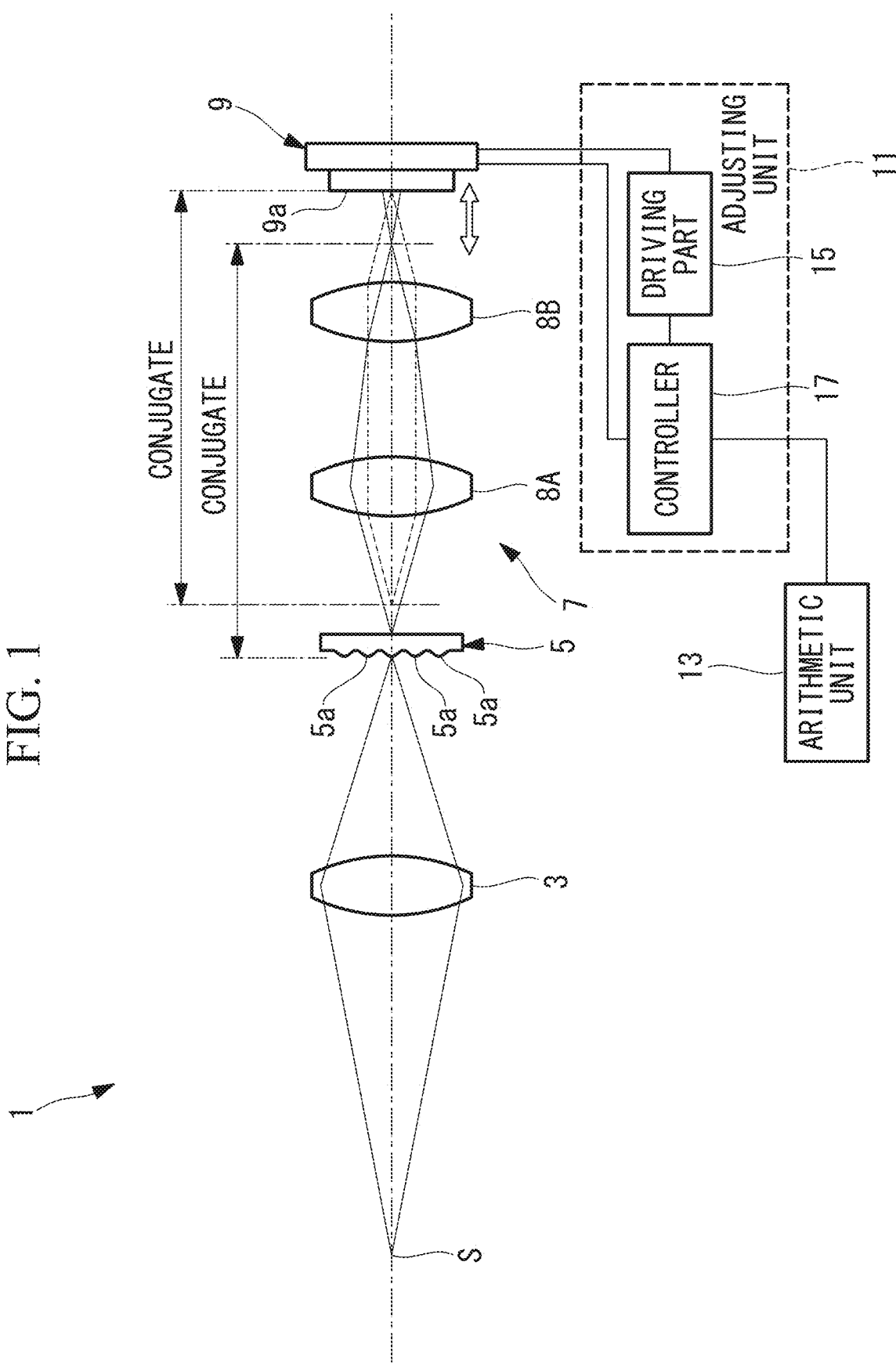
FIG. 1 schematically shows an imaging device according to an embodiment of the present invention.

As shown in FIG. 1, an imaging device 1 according to this embodiment includes: an imaging optical system 3 that collects light coming from a subject S (object point) to form a primary image of the subject S; a microlens array 5 having a plurality of microlenses 5a that collect light coming from the imaging optical system 3; a relay optical system 7 that relays the light collected by the plurality of microlenses 5a and reforms the primary image to form a secondary image; a light-receiving part 9 having a plurality of light-receiving elements 9a that receive and photoelectrically convert the light relayed by the relay optical system 7; an adjusting unit 11 that switches the positional relationship between the plurality of light-receiving elements 9a and the microlens array 5; and an arithmetic unit 13 that generates an image.

As shown in FIG. 1, the microlens array 5 is formed of the plurality of microlenses 5a having large convex power (positive power) on one side closer to the subject S. The plurality of microlenses 5a are disposed at a position conjugate with the primary image formed by the imaging optical system 3 and are two-dimensionally arrayed in directions intersecting the optical axis of the imaging optical system 3 and the relay optical system 7. The plurality of microlenses 5a are arrayed at a sufficiently larger pitch than the pitch of the light-receiving elements 9a (for example, a pitch that is ten times or more the pitch of the light-receiving elements 9a).

The plurality of microlenses 5a have a surface shape that satisfies the expression below:

$$PV/\lambda < \{M/(NA_{ob})\}^2$$

where PV is the distance, in the surface of the microlens 5a having power, between the position closest to the subject S and the position farthest from the subject S in a direction parallel to the optical axis; M is the lateral magnification of the imaging optical system 3; $NA_{ob}$ is the subject-S-side numerical aperture of the imaging optical system 3; and λ is the wavelength of the light coming from the subject S and entering the imaging optical system 3.

The relay optical system 7 is formed of a plurality of (in this embodiment, two) lenses 8A and 8B. In a first layout state described below, at least the secondary image side of the relay optical system 7 is telecentric.

The light-receiving part 9 is provided so as to be movable in a direction parallel to the optical axis of the relay optical system 7. The plurality of light-receiving elements 9a are two-dimensionally arrayed in directions intersecting the optical axis of the relay optical system 7. Multiple light-receiving elements 9a are disposed in an area corresponding to each of the plurality of microlenses 5a of the microlens array 5. The plurality of light-receiving elements 9a photoelectrically convert the detected light and output light intensity signals, serving as image information of the subject S.

The adjusting unit 11 includes a driving part 15, such as, for example, a stepping motor or a piezo actuator, that moves the light-receiving part 9 in a direction parallel to the optical axis of the relay optical system 7, and a controller 17 that performs control or the like of the driving part 15.

The controller 17 includes, for example: a CPU (central processing unit); main storage units, such as a ROM (read only memory) and a RAM (random access memory); an auxiliary storage unit, such as an HDD (hard disk drive); an input part through which a user inputs instructions; an output part that outputs data; an external interface via which various data are exchanged with external devices; and the like (all of these components are not shown). The auxiliary storage unit stores various programs. As a result of the CPU reading a program from the auxiliary storage unit into the main storage unit, such as the RAM, and executing the program, various processing is implemented.

More specifically, the controller 17 drives the driving part 15 to switch between the first layout state, in which the light-receiving part 9 is disposed at a position conjugate with back focal positions of the microlenses 5a, and the second layout state, in which the light-receiving part 9 is disposed at a position conjugate with principal-point positions of the microlenses 5a. In the first layout state, in which the plurality of light-receiving elements 9a are disposed at a position conjugate with back focal positions of the microlenses 5a, a light-field image can be acquired. In the second layout state, in which the plurality of light-receiving elements 9a are disposed at a position conjugate with principal-point positions of the microlenses 5a, an ordinary two-dimensional image can be acquired.

When the controller 17 switches the layout to the first layout state, the controller 17 inputs, to the arithmetic unit 13, information indicating that the device is set to the first layout state, and, when the controller 17 switches the layout to the second layout state, the controller 17 inputs, to the arithmetic unit 13, information indicating that the device is set to the second layout state. The controller 17 transmits light intensity signals output from the plurality of light-receiving elements 9a of the light-receiving part 9 to the arithmetic unit 13.

When the controller 17 inputs, to the arithmetic unit 13, information indicating that the device is set to the first layout state, the arithmetic unit 13 performs predetermined image processing for generating a light-field processed image (for example, a 2D slice image or a 3D multi-slice image) on the light intensity signals transmitted from the controller 17 to generate a final image.

When the controller 17 inputs, to the arithmetic unit 13, information indicating that the device is set to the second layout state, the arithmetic unit 13 does not perform predetermined image processing for generating a light-field processed image, but performs image processing for generating an ordinary two-dimensional image on the light intensity signals transmitted from the controller 17 to generate a final image.

The operation of the thus-configured imaging device 1 will be described with reference to the flowchart in FIG. 2.

When an image of the subject S is acquired by using the imaging device 1 according to this embodiment, first, the controller 17 drives the driving part 15 to adjust the position of the light-receiving part 9 in a direction parallel to the optical axis of the relay optical system 7, setting the device to the first layout state or the second layout state (step SA1). When the device is set to the first layout state, the information indicating that the device is set to the first layout state is input from the controller 17 to the arithmetic unit 13, and, when the device is set to the second layout state, the information indicating that the device is set to the second layout state is input to the arithmetic unit 13 from the controller 17.

The light coming from the subject S is collected by the imaging optical system 3, enters the microlens array 5, passes through the plurality of microlenses 5a of the microlens array 5, and is relayed by the relay optical system 7. Then, the beams passing through the microlenses 5a are each received by corresponding pluralities of the light-receiving elements 9a of the light-receiving part 9 and are photoelectrically converted. The light intensity signals obtained as a result of the photoelectrical conversion by the light-receiving elements 9a are transmitted to the arithmetic unit 13.

In the arithmetic unit 13, an intensity distribution $I_m$ in the light-receiving part 9 is obtained on the basis of the light intensity signals transmitted from the light-receiving part 9 (step SA2).

When information indicating that the device is set to the first layout state is input from the controller 17 (step SA3 "YES"), the arithmetic unit 13 performs, on the obtained intensity distribution $I_m$, refocusing processing to an arbitrary subject distance (step SA4). Next, the arithmetic unit 13 performs 3D conversion processing to present a three-dimensional image (step SA5), and a light-field processed image is generated and output (step SA6).

On the other hand, when information indicating that the device is set to the second layout state is input from the controller 17 (step SA3 "NO"), the arithmetic unit 13 generates a two-dimensional image on the basis of the obtained intensity distribution $I_m$ and outputs that image (step SA7).

As described above, the imaging device 1 according to this embodiment can acquire a light-field image when the adjusting unit 11 sets the device to the first layout state and can acquire an ordinary two-dimensional image when the adjusting unit 11 sets the device to the second layout state.

In other words, both a light-field image and an ordinary two-dimensional image can be acquired simply by switching between the first layout state and the second layout state with the adjusting unit 11. The first layout state and the second layout state can be switched with a simple configuration in which only the light-receiving part 9 is moved. Accordingly, this configuration is suitable for obtaining a light-field image and enables, with a simple configuration, observation equivalent to ordinary observation.

Figure 3:
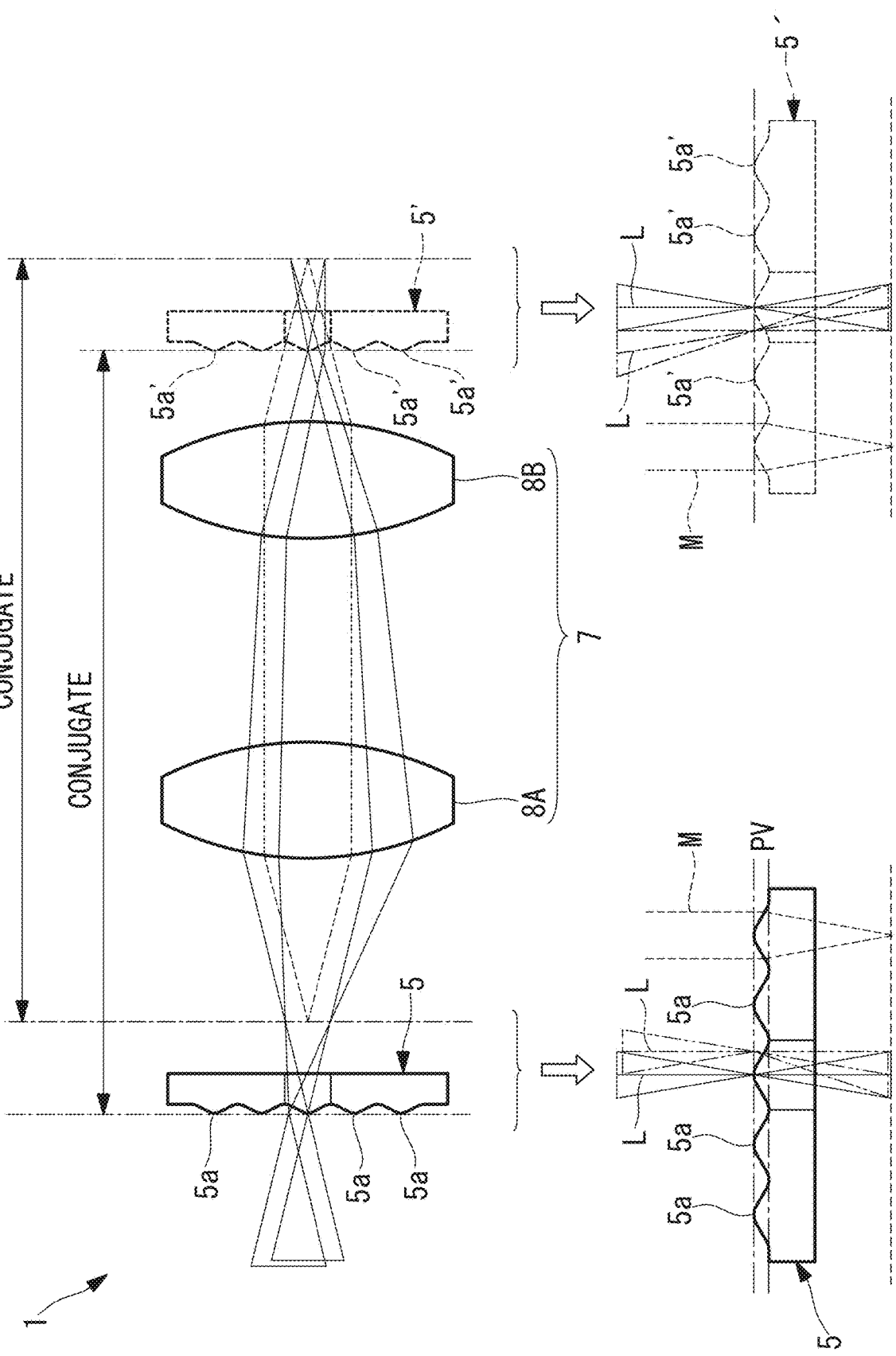
FIG. 3 shows an example of refraction of light at the microlenses in FIG. 1 and refraction of light at the projection plane of the microlenses projected by the relay optical system.

Herein, as shown in FIG. 3, the beam (wavefront) that actually enters the microlens array 5 is refracted by the front and rear surfaces of the microlenses 5a. On the other hand, although the behavior of the beam projected by the relay optical system 7 is the same as the behavior of the beam near the microlenses 5a, refraction does not actually occur on a projection plane 5a' of the microlenses 5a projected by the relay optical system 7.

Hence, although the wavefronts are equivalent in the first layout state, the wavefronts are not equivalent in the second layout state, and, for example, spherical aberration caused by the rear surface of the microlenses 5a remains in an image formed in a relay space. In FIG. 3, reference sign L denotes the principal ray, reference sign M denotes a beam exiting from one point in the pupil of the imaging optical system 3, and reference sign 5' denotes the microlenses projected by the relay optical system 7.

If the surface shapes of the plurality of microlenses 5a satisfy the expression above, the refraction occurring at the surface of the microlens array 5 having power is two-dimensionally applied also in the second layout state. As a result, in the second layout state, the wavefront on the surface having power in the projection space can accurately reproduce the actual wavefront on the surfaces of the microlenses 5a, thus enabling acquiring of a high-definition two-dimensional image.

Because the microlens array 5 is disposed such that the surfaces of the plurality of microlenses 5a having large convex power face the subject S side, it is possible to obtain an even higher-definition light-field image in the first layout state. In particular, this configuration is preferable in terms of aberration.

Figure 4:
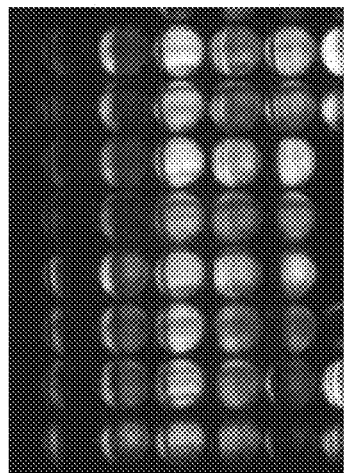
FIG. 4 shows an example image obtained in a first layout state.

Herein, in acquiring an image of a subject S that is located at an object position conjugate with the microlens array 5 (i.e., the focal position in a regular optical system) in the first layout state, the light-receiving part 9 is located at a position conjugate with an (exit) pupil. Accordingly, a subject S that is conjugate with an end of one microlens 5a and a subject S that is conjugate with the central portion of that microlens 5a form substantially the same intensity distributions. Hence, as shown in FIG. 4, the sampling of the subject space is determined by the pitch of the microlenses 5a of the microlens array 5, and it is not possible to directly observe a structure that is smaller than or equal to the size of the microlens 5a.

Figure 5:
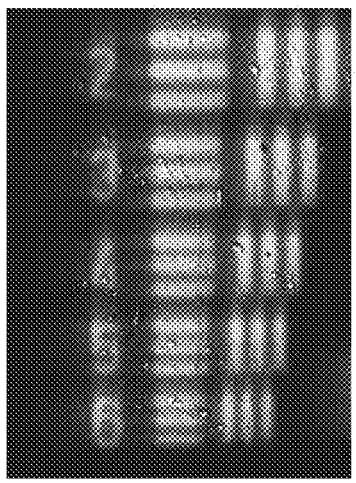
FIG. 5 shows an example image obtained in a second layout state.

On the other hand, in the second layout state, the light-receiving part 9 is disposed at a position where the power of the microlens array 5 is practically canceled. Hence, as shown in FIG. 5, it is possible to directly observe a structure that is smaller than or equal to the size of the microlens 5a.

Figure 6:
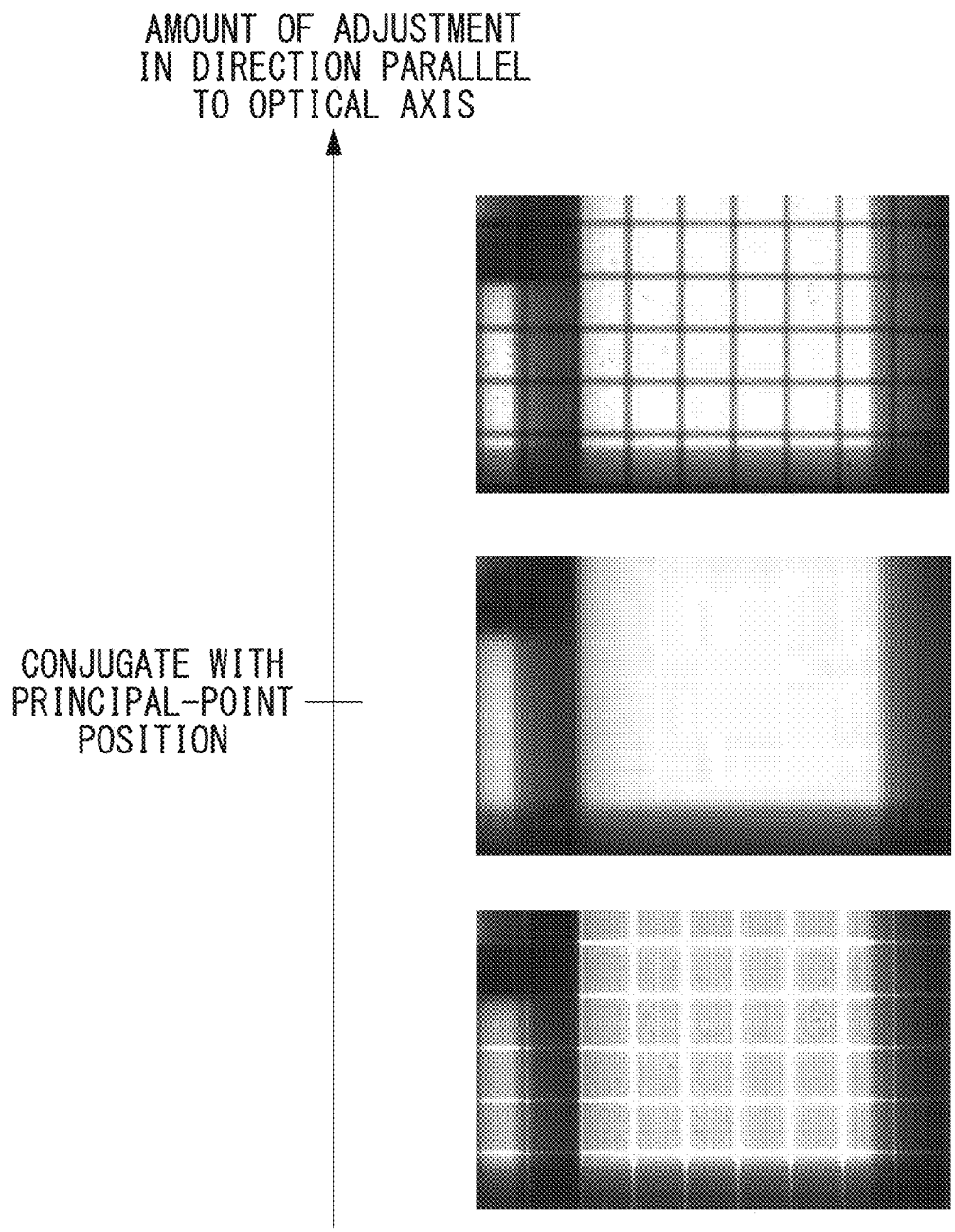
FIG. 6 shows an example image obtained when a plurality of light-receiving elements and principal-point positions of the microlenses are conjugate with each other, and example images obtained when the plurality of light-receiving elements are slightly shifted in a direction parallel to the optical axis from principal-point positions of the microlenses.

In image acquiring in the second layout state, as shown in FIG. 6, image acquiring may be performed while slightly shifting the light-receiving part 9 forward or backward from principal-point positions of the microlenses 5a in a direction parallel to the optical axis. By doing so, it is possible to reverse the contrast of the boundary between adjacent microlenses 5a. Accordingly, by subtracting the influence of the boundary between adjacent microlenses 5a through image processing, it is possible to generate an image closer to one acquired in an ordinary imaging state.

As shown in FIG. 6, also in a single imaging operation, although it is possible to confirm that the influence of the boundary between adjacent microlenses 5a can be ignored when the plurality of light-receiving elements 9a and principal-point positions of the microlenses 5a are disposed conjugate with each other (i.e., in the second layout state), by acquiring an image while slightly shifting the light-receiving part 9 forward or backward from principal-point positions of the microlenses 5a in a direction parallel to the optical axis, even in the case where the imaging optical system 3 and the relay optical system 7 have curvature of field, it is possible to obtain a high-quality image over the entire area of the image.

This embodiment can be modified as follows.

Figure 2:
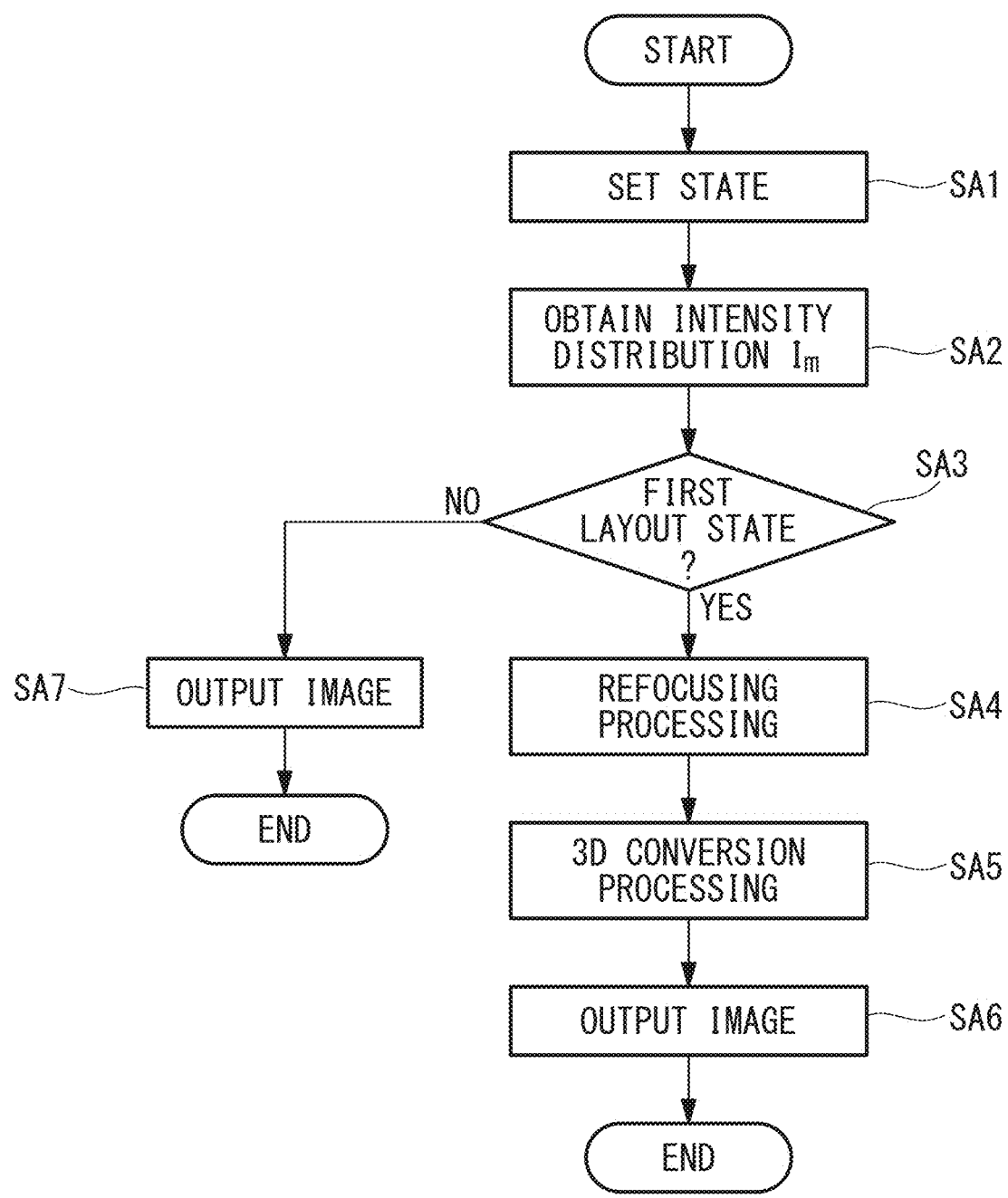
FIG. 2 is a flowchart describing a process of acquiring an image of a subject with the imaging device in FIG. 1.

For example, in this embodiment, although 3D conversion processing is performed in step SA5 in the flowchart in FIG. 2, step SA5 may be omitted.

Figure 7:
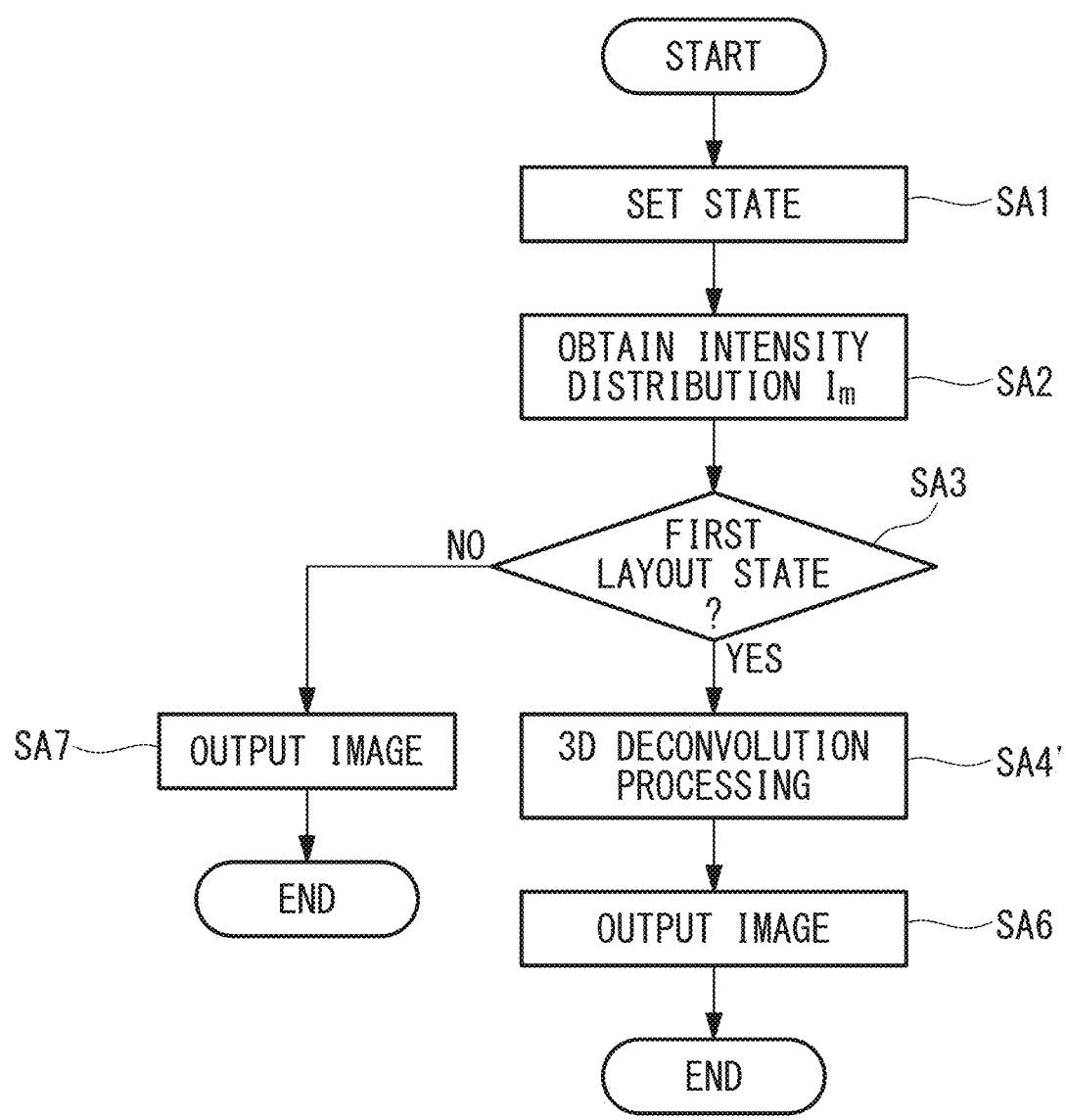
FIG. 7 is a flowchart describing a process of acquiring an image of a subject with an imaging device according to a modification of the embodiment of the present invention.

Instead of the refocusing processing (step SA4) and the 3D conversion processing (step SA5), for example, as shown in step SA4' in FIG. 7, the arithmetic unit 13 may perform 3D deconvolution processing on light intensity signals obtained in the first layout state.

Figure 8:
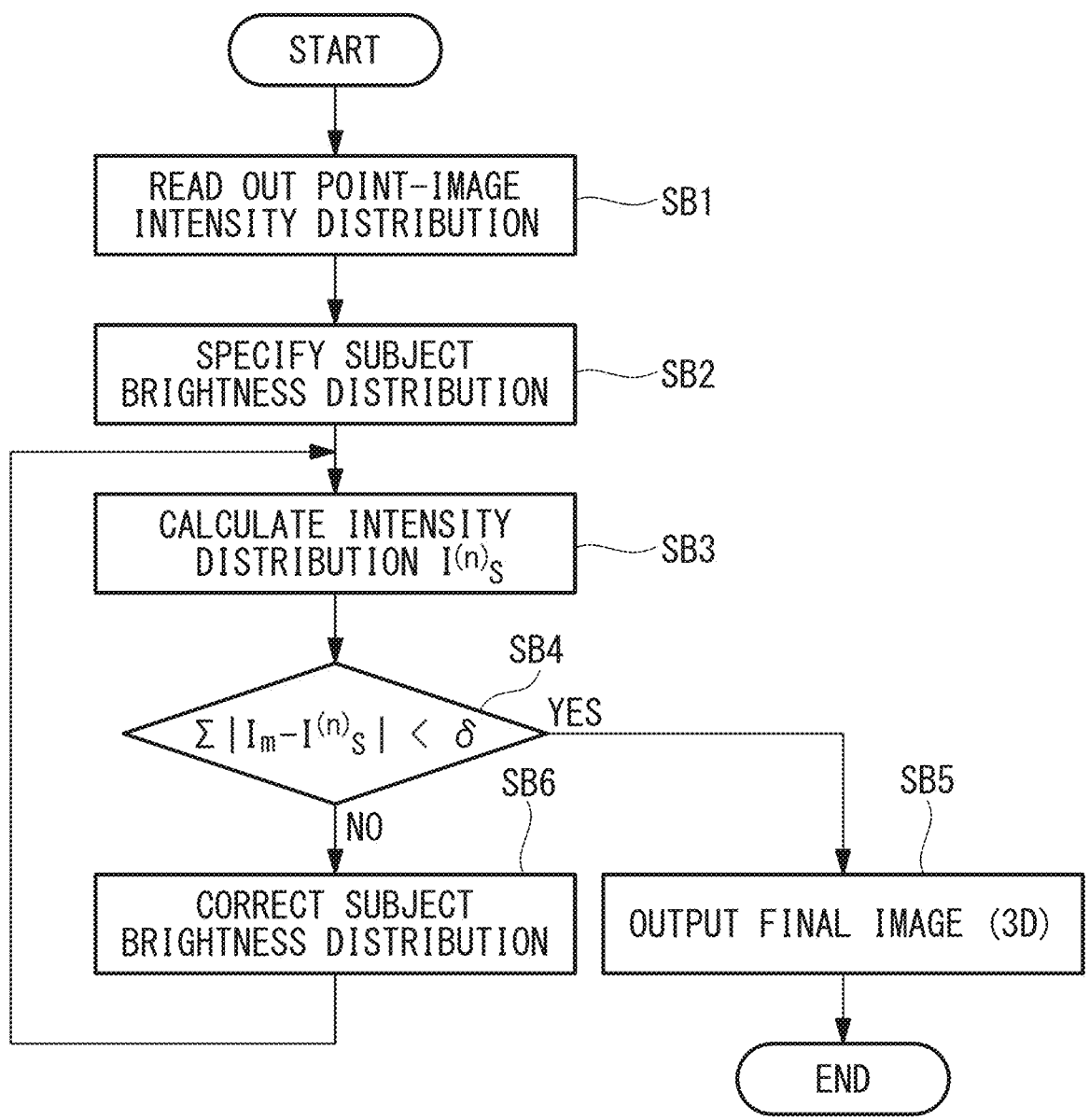
FIG. 8 is a flowchart describing 3D deconvolution processing in FIG. 7.

In the 3D deconvolution processing, for example, as shown in the flowchart in FIG. 8, first, point-image intensity distribution of each subject position in the light-receiving part 9 in the first layout state is preliminarily prepared and is read out (step SB1). Next, initial subject brightness distribution is specified (step SB2).

Next, the intensity distribution $I^{(n)}{}_S$ in the light-receiving part 9 is calculated on the basis of the point-image intensity distribution read out in step SB1 and the subject brightness distribution specified in step SB2 (step SB3). Then, the intensity distribution $I_m$ obtained in step SA2 of the flowchart in FIG. 2 and the intensity distribution $I^{(n)}{}_S$ calculated in step SB3 of the flowchart in FIG. 8 are compared (step SB4).

When the absolute value of the error amount (difference) between the intensity distribution $I_m$ and the intensity distribution $I^{(n)}{}_S$ is smaller than a predetermined value (σ), the intensity distribution $I^{(n)}{}_S$ is converted into an image, serving as information about the three-dimensional distribution of the subject S, and is output (step SB5). The conversion into an image is not necessary, and a signal indicating information about the three-dimensional distribution of the subject S may be output.

On the other hand, when the absolute value of the error amount (difference) between the intensity distribution $I_m$ and the intensity distribution $I^{(n)}{}_S$ is greater than or equal to the predetermined value (σ), the initial subject brightness distribution is corrected (step SB6), and the process returns to step SB3, where the intensity distribution $I^{(n)}{}_S$ of the light-receiving part 9 is calculated again. Then, step SB3 to step SB6 are repeated until the absolute value of the error amount (difference) between the intensity distribution $I_m$ and the intensity distribution $I^{(n)}{}_S$ becomes smaller than the predetermined value ($\sigma$).

By doing so, it is possible to generate a three-dimensional light-field processed image, without additionally performing 3D conversion processing, as described in step SA5 of the flowchart in FIG. 2.

Instead of the method described in step SB2 to step SB5 in FIG. 8, for example, it is possible to employ the Lucy Richardson algorithm, a machine learning method, or a deep learning method. Alternatively, regularization processing may be incorporated.

Figure 9:
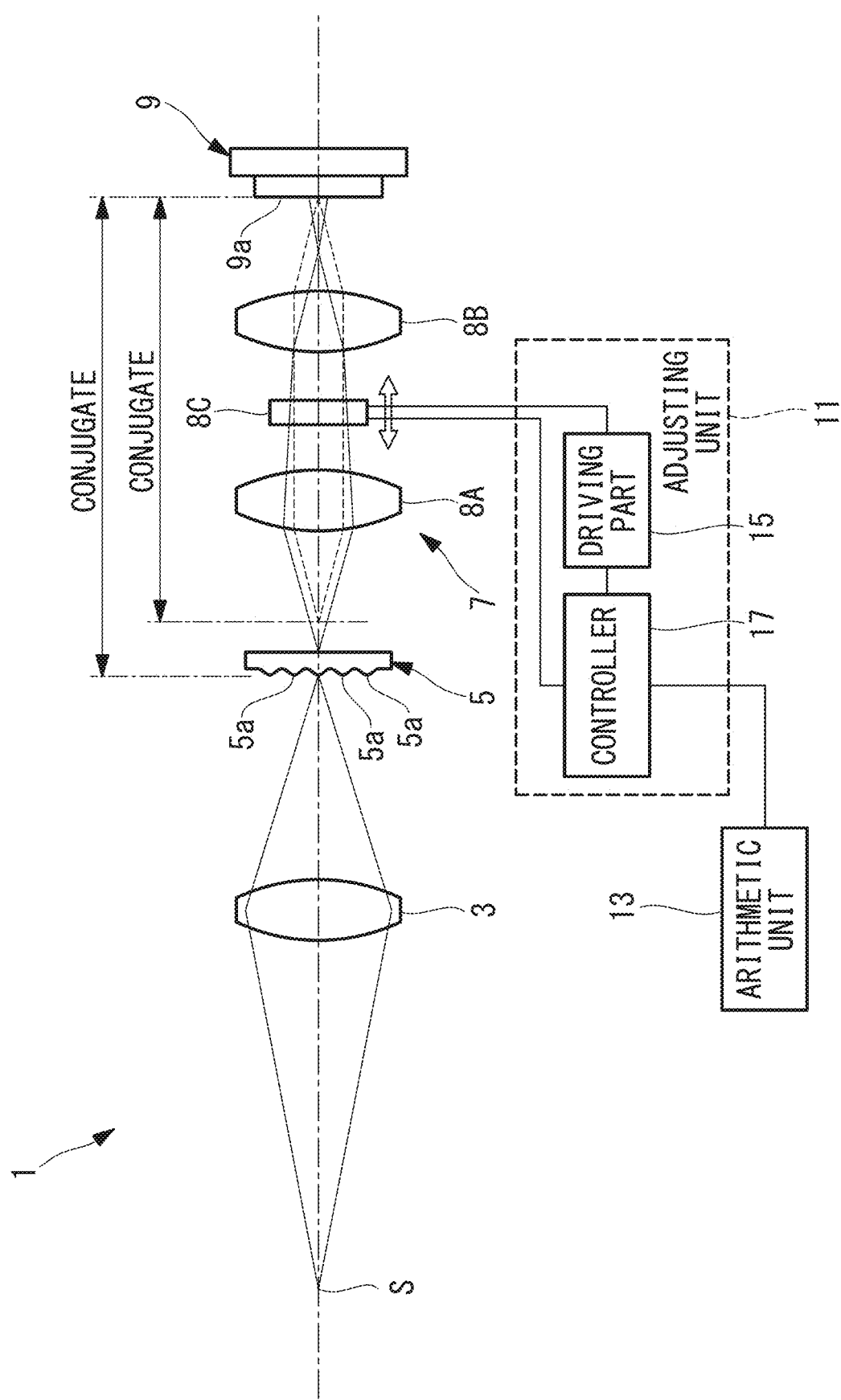
FIG. 9 schematically shows an imaging device according to a modification of the embodiment of the present invention.

In this embodiment, the driving part 15 moves the light-receiving part 9 to switch between the first layout state and the second layout state. Instead, for example, as shown in FIG. 9, the relay optical system 7 may include, beside the lenses 8A and 8B, a focus lens group (lens) 8C that is movable in a direction parallel to the optical axis of the relay optical system 7, and, the driving part 15 may move the focus lens group 8C in a direction parallel to the optical axis of the relay optical system 7 to switch between the first layout state and the second layout state.

In this case, when the driving part 15 moves the position of the focus lens group 8C to establish the first layout state, in which the plurality of light-receiving elements 9a and back focal positions of the microlenses 5a are conjugate with each other, a light-field image can be acquired, and, when the driving part 15 moves the position of the focus lens group 8C to establish the second layout state, in which the plurality of light-receiving elements 9a and principal-point positions of the microlenses 5a are conjugate with each other, an ordinary two-dimensional image can be acquired.

Accordingly, it is possible to acquire both a light-field image and an ordinary two-dimensional image by switching between the first layout state and the second layout state, without moving the light-receiving part 9 in a direction parallel to the optical axis of the relay optical system 7.

In this embodiment, although the microlens 5a having power on one side has been described as an example, instead, it is possible to employ a microlens having power on both sides. In that case, in the microlens having power on both sides, the sum of the distance (PV value) between the position closest to the subject S and the position farthest from the subject S in a direction parallel to the optical axis in one side and that in the other side may be regarded as the total PV value of the microlens having power on both sides.

In this embodiment, the imaging optical system 3 may be formed of a plurality of lenses, or may be formed of an objective optical system and an image-forming optical system. An illumination optical system may be separately provided, or various filters may be separately provided.

Figure 10:
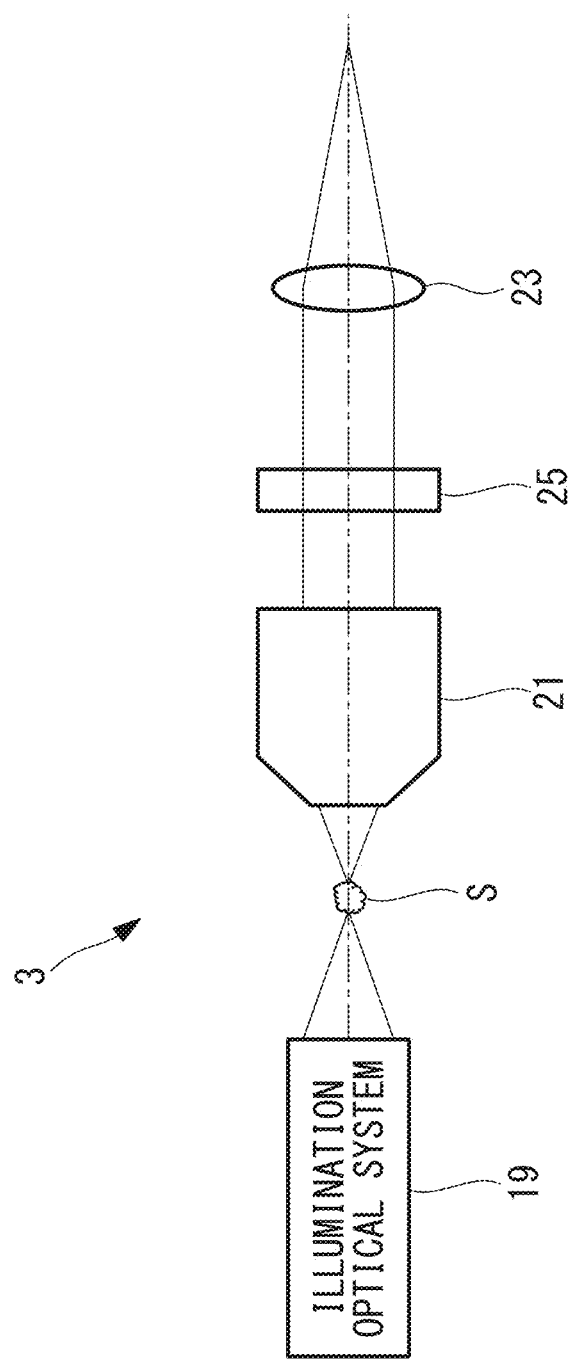
FIG. 10 shows an example configuration of an imaging optical system when the imaging device according to the embodiment of the present invention is incorporated into a microscope.

When the imaging device 1 according to this embodiment is incorporated into a microscope, for example, as shown in FIG. 10, an illumination optical system 19 that emits light onto the subject S, an objective lens 21, serving as the imaging optical system 3, that collects light coming from the subject S, and an image forming lens 23 that collects light coming from the objective lens 21 and forms an image may be provided.

When excitation light is radiated onto the subject S with the illumination optical system 19, and fluorescence generated in the subject S is detected, as shown in FIG. 10, a filter 25 that removes the excitation light from the light collected by the objective lens 21 while allowing the fluorescence to pass therethrough may be provided.

Figure 11:
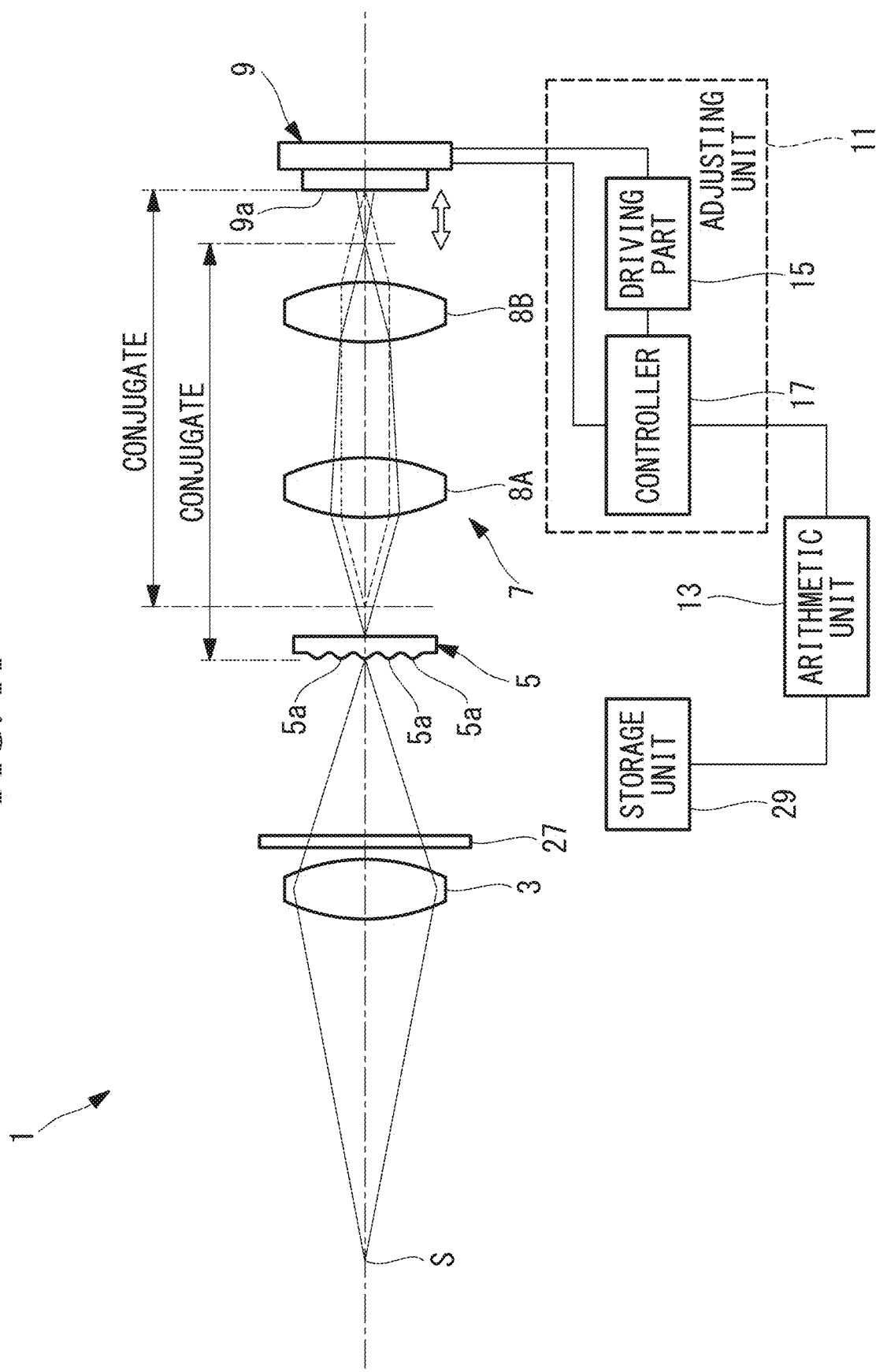
FIG. 11 schematically shows an imaging device, serving as a modification of the embodiment of the present invention, in which a pupil modulation element is provided in a configuration in which the light-receiving part is moved by an adjusting unit.
Figure 12:
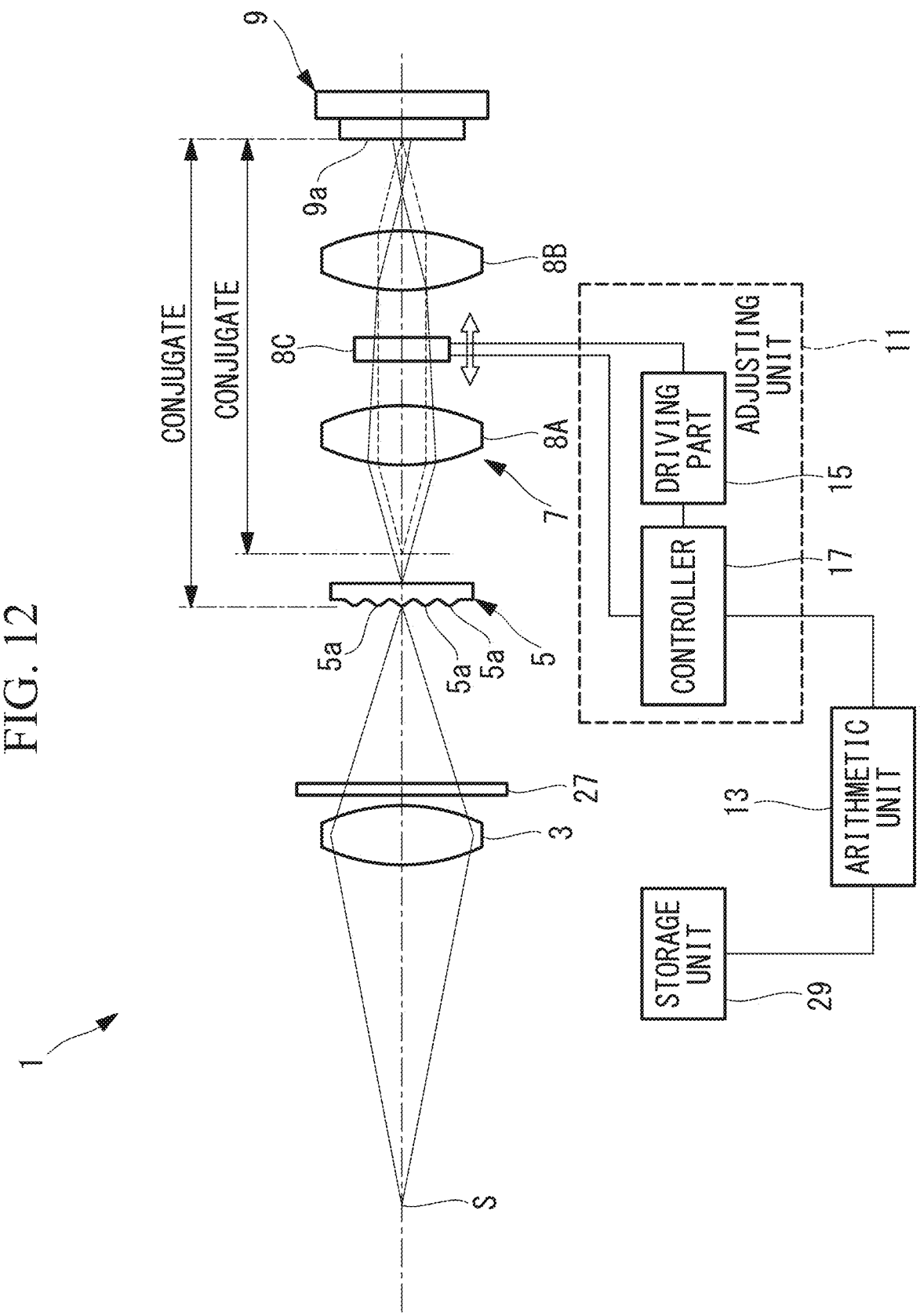
FIG. 12 schematically shows an imaging device, serving as a modification of the embodiment of the present invention, in which a pupil modulation element is provided in a configuration in which the focus lens group is moved by the adjusting unit.

In this embodiment, for example, as shown in FIGS. 11 and 12, a pupil modulation element 27 that modulates phase distribution of the light coming from the imaging optical system 3 and entering the plurality of microlenses 5a, and a storage unit 29 that stores a first point-image intensity distribution, which indicates the point-image intensity distribution of each subject position in the light-receiving part 9 in the first layout state and a second point-image intensity distribution, which indicates the point-image intensity distribution of the subject S, in the light-receiving part 9 in the second layout state may be provided.

The pupil modulation element 27 may be disposed at the position of the exit pupil of the imaging optical system 3, which is closer to the subject S than the microlens array 5 is, or at a position conjugate with the exit pupil. This pupil modulation element 27 increases the depth of field in ordinary observation.

When the device is set to the first layout state, the arithmetic unit 13 may generate a light-field processed image by using the first point-image intensity distribution stored in the storage unit 29 and the light intensity signals output from the light-receiving part 9 in the first layout state, and, when the device is set to the second layout state, the arithmetic unit 13 may generate an ordinary two-dimensional image by using the second point-image intensity distribution stored in the storage unit 29 and the light intensity signals output from the light-receiving part 9 in the second layout state.

By doing so, when the device is set to the first layout state, a high-definition light-field image can be acquired, and when the device is set to the second layout state, an ordinary two-dimensional image can be acquired with increased depth of field.

Although an example configuration in which the plurality of microlenses 5a of the microlens array 5 are disposed at the position of the primary image formed by the imaging optical system 3 has been described in this embodiment, the plurality of microlenses 5a of the microlens array 5 may be disposed at a position conjugate with the position of the primary image formed by the imaging optical system 3.

As a result, the following aspect is read from the above described embodiment of the present invention.

An aspect of the present invention is an imaging device including: an imaging optical system that collects light from a subject and forms a primary image of the subject; a microlens array having a plurality of microlenses that are two-dimensionally arrayed at a position of the primary image formed by the imaging optical system or a position conjugate with the primary image and that collect light coming from the imaging optical system; a relay optical system that relays the light collected by the microlenses and re-forms the primary image to form a secondary image; a light-receiving part that has a plurality of light-receiving elements disposed in an area corresponding to each of the plurality of microlenses, the plurality of light-receiving elements receiving the light relayed by the relay optical system and photoelectrically converting the light; and an adjusting unit that switches between a first layout state, in which the plurality of light-receiving elements and back focal positions of the microlenses are conjugate with each other, and a second layout state, in which the plurality of light-receiving elements and principal-point positions of the microlenses are conjugate with each other.

According to this aspect, the light coming from the subject and collected by the imaging optical system is relayed by the relay optical system through the microlenses of the microlens array, and the beams passing through the microlenses are received by the plurality of light-receiving elements of the light-receiving part and are photoelectrically converted. By relaying the beams passing through the respective microlenses with the relay optical system, it is possible to make the respective light-receiving elements and back focal positions of the microlenses conjugate with each other or to make the respective light-receiving elements and principal-point positions of the respective microlenses conjugate with each other.

In this case, by achieving the first layout state, in which the plurality of light-receiving elements and back focal positions of the microlenses are conjugate with each other, with the adjusting unit, a light-field image can be acquired. On the other hand, by achieving the second layout state, in which the plurality of light-receiving elements and principal-point positions of the microlenses are conjugate with each other, with the adjusting unit, an ordinary two-dimensional image can be acquired.

That is, simply by switching between the first layout state and the second layout state with the adjusting unit, it is possible to acquire both a light-field image and an ordinary two-dimensional image. Accordingly, this configuration is suitable for obtaining a light-field image and enables, with a simple configuration, observation equivalent to ordinary observation.

In the above aspect, the plurality of microlenses each have a surface shape that satisfies the expression below:

$$PV/\lambda < \{M/(NA_{ob})\}^2$$

$$PV/\lambda < \{M/(NA_{ob})\}^2$$

where PV is the distance, in the surface of the microlens having power, between a position closest to the subject and a position farthest from the subject in a direction parallel to the optical axis; M is the lateral magnification of the imaging optical system; $NA_{ob}$ is the subject-side numerical aperture of the imaging optical system, and λ is the wavelength of the light entering the imaging optical system.

The beam (wavefront) entering the microlens array is refracted by the front and rear surfaces of the microlenses. Although the behavior of the beam projected by the relay optical system is the same as the behavior of the beam near the microlenses, because refraction does not actually occur on a projection plane, the wavefronts are equivalent in the first layout state, whereas the wavefronts are not equivalent in the second layout state. The above configuration makes it possible to enable, in the second layout state, the wavefront on the surface having power in the projection space to accurately reproduce the actual wavefront on the surfaces of the microlenses, thus enabling acquiring of a high-definition two-dimensional image.

In the above aspect, the plurality of microlenses may have positive power on the subject side.

This configuration makes it possible to obtain an even higher-definition light-field image in the first layout state. In particular, this configuration is preferable in terms of aberration.

In the above aspect, the adjusting unit may switch between the first layout state and the second layout state by moving the light-receiving part in a direction parallel to the optical axis of the relay optical system.

This configuration makes it possible to switch between the first layout state and the second layout state with a simple configuration in which only the light-receiving part is moved.

In the above aspect, the relay optical system may include a plurality of lenses, and the adjusting unit may switch between the first layout state and the second layout state by moving at least one of the lenses in the relay optical system in a direction parallel to the optical axis.

This configuration makes it possible to change the position of the light relayed by the relay optical system in accordance with the position of the lens of the relay optical system moved by the adjusting unit in a direction parallel to the optical axis. Accordingly, it is possible to switch between the first layout state and the second layout state without moving the light-receiving part in a direction parallel to the optical axis of the relay optical system.

In the above aspect, in the first layout state, at least the secondary image side of the relay optical system may be telecentric.

This configuration suppresses shading caused by tilting of the angle of incidence of the beam on the microlenses and, thus, suppresses deterioration of the image quality. Because the magnification from the subject to the light-receiving part is fixed, the degree of matching of the composition when the first layout state and the second layout state are switched by the adjusting unit is secured.

REFERENCE SIGNS LIST 1 imaging device
3 imaging optical system
5 microlens array
5a microlens
7 relay optical system
9 light-receiving part
9a light-receiving element
11 adjusting unit
S subject (object point)

The invention claimed is:

1. An imaging device comprising:
an optical imaging system that is configured to collect light from a subject and to form a primary image of the subject;
a microlens array having a plurality of microlenses that are two-dimensionally arrayed at a position of the primary image formed by the optical imaging system or a position conjugate with the primary image and that collect light coming from the optical imaging system;
a optical relay system that is configured to relay the light collected by the microlenses and re-forms the primary image to form a secondary image;
a light-receiving part that has a plurality of light-receiving elements disposed in an area corresponding to each of the plurality of microlenses, the plurality of light-receiving elements is configured to receive the light relayed by the optical relay system and to photoelectrically convert the light; and
an adjusting unit that is configured to switch between a first layout state, in which the plurality of light-receiving elements and back focal positions of the microlenses are conjugate with each other, and a second layout state, in which the plurality of light-receiving elements and principal-point positions of the microlenses are conjugate with each other.

2. The imaging device according to claim 1, wherein the plurality of microlenses each have a surface shape that satisfies the expression below:

$$PV/\lambda < \{M/(NA_{ob})\}^2$$

where PV is the distance, in the surface of the microlens having power, between a position closest to the subject and a position farthest from the subject in a direction parallel to an optical axis; M is a lateral magnification of the optical imaging system; $NA_{ob}$ is a subject-side numerical aperture of the optical imaging system, and $\lambda$ is a wavelength of the light entering the optical imaging system.

3. The imaging device according to claim 1, wherein the plurality of microlenses have positive power on the subject side.

4. The imaging device according to claim 1, wherein the adjusting unit switches between the first layout state and the second layout state by moving the light-receiving part in a direction parallel to an optical axis of the optical relay system.

5. The imaging device according to claim 1, wherein
the optical relay system includes a plurality of lenses, and
the adjusting unit switches between the first layout state and the second layout state by moving at least one of the lenses in the optical relay system in a direction parallel to an optical axis.

6. The imaging device according to claim 1, wherein, in the first layout state, at least the secondary image side of the optical relay system is telecentric.

\* \* \* \* \*